(12) United States Patent
Cumberland et al.

(10) Patent No.: US 8,348,453 B2
(45) Date of Patent: Jan. 8, 2013

(54) SOLAR POWERED LIGHT ASSEMBLY

(76) Inventors: Holly S. Cumberland, Malibu, CA (US); Todd Cumberland, Malibu, CA (US)

( * ) Notice: Subject to any disclaimer, the term of this patent is extended or adjusted under 35 U.S.C. 154(b) by 400 days.

(21) Appl. No.: 12/538,777

(22) Filed: Aug. 10, 2009

(65) Prior Publication Data
US 2011/0032695 A1 Feb. 10, 2011

(51) Int. Cl.
*F21L 13/00* (2006.01)
(52) U.S. Cl. .......................... 362/192; 362/20; 362/276
(58) Field of Classification Search .................. 362/20, 362/157, 276, 183, 184, 186, 190, 209, 227, 362/236, 240, 243, 247, 249.02, 249.11, 362/299, 310, 326, 327, 334, 363, 431, 800, 362/802; 315/86, 291
See application file for complete search history.

(56) References Cited

U.S. PATENT DOCUMENTS

| | | | |
|---|---|---|---|
| 4,130,082 A * | 12/1978 | Bouchard et al. | 116/5 |
| 4,782,432 A * | 11/1988 | Coffman | 362/184 |
| 4,823,241 A * | 4/1989 | Trattner | 362/183 |
| 4,918,357 A * | 4/1990 | Waterbury | 315/87 |
| 4,977,488 A | 12/1990 | Spotts et al. | |
| 5,204,586 A | 4/1993 | Moore | |
| 5,217,296 A | 6/1993 | Tanner et al. | |
| 5,528,471 A * | 6/1996 | Green | 362/147 |
| 6,280,053 B1 | 8/2001 | Chien | |
| 6,421,952 B1 * | 7/2002 | Vascocu | 43/113 |
| 6,563,269 B2 | 5/2003 | Robinett et al. | |
| 6,573,659 B2 | 6/2003 | Toma et al. | |
| 6,609,804 B2 | 8/2003 | Nolan et al. | |
| 6,942,361 B1 * | 9/2005 | Kishimura et al. | 362/240 |
| 7,021,787 B1 | 4/2006 | Kuelbs | |
| 7,057,821 B2 * | 6/2006 | Zincone | 359/595 |
| 7,176,400 B1 * | 2/2007 | Yeh | 200/339 |
| 7,253,570 B2 * | 8/2007 | Ayres | 315/308 |
| 7,360,918 B2 | 4/2008 | Trombetta et al. | |
| 7,486,033 B2 * | 2/2009 | Chen et al. | 315/294 |
| 7,686,469 B2 * | 3/2010 | Ruud et al. | 362/101 |
| 7,771,087 B2 * | 8/2010 | Wilcox et al. | 362/294 |
| 7,862,198 B2 * | 1/2011 | Shyu et al. | 362/192 |
| 7,862,200 B2 * | 1/2011 | Custodis et al. | 362/217.06 |
| 2004/0051466 A1 * | 3/2004 | Liu | 315/149 |
| 2008/0074867 A1 | 3/2008 | Chen | |
| 2008/0304272 A1 * | 12/2008 | Joasil et al. | 362/458 |
| 2009/0154148 A1 * | 6/2009 | Meyer et al. | 362/157 |
| 2009/0224681 A1 * | 9/2009 | Bassford et al. | 315/176 |
| 2010/0302764 A1 * | 12/2010 | Yu et al. | 362/183 |

FOREIGN PATENT DOCUMENTS

DE 3403503 A1 * 8/1985

* cited by examiner

*Primary Examiner* — Hargobind S Sawhney
(74) *Attorney, Agent, or Firm* — Brian B. Shaw, Esq.; Jodi A. Reynolds, Esq.; Harter Secrest & Emery LLP

(57) ABSTRACT

A light assembly comprising a globe, an electric grid powered lighting element disposed within the globe, a solar powered lighting element disposed within the globe, a solar panel coupled to the solar powered lighting element for collecting light and generating power for the solar powered lighting element, a rechargeable power source coupled to the solar panel and the solar powered lighting element for storing the power generated by the solar panel and powering the solar powered lighting element, a first sensor for detecting an ambient light level and activating the solar powered lighting element when the ambient light level is below a desired ambient light level, and, a second sensor for detecting output levels of the solar powered lighting element and activating the electric grid powered lighting element when the output level of the solar powered lighting element is below a desired output level.

18 Claims, 7 Drawing Sheets

SOLAR POWERED LIGHT ASSEMBLY

CROSS-REFERENCE TO RELATED APPLICATIONS

None.

STATEMENT REGARDING FEDERALLY SPONSORED RESEARCH OR DEVELOPMENT

None.

REFERENCE TO A "SEQUENCE LISTING"

None.

BACKGROUND OF THE INVENTION

1. Field of the Invention

The present invention relates generally to a solar powered light and more particularly to a solar powered light for providing an alternative or additional light source in a light fixture.

2. Description of Related Art

Over recent years, there has been volatility in the price of electricity. In addition to price volatility, the use of certain fuels has been found to be harmful to the environment. For example, when electricity is generated from coal, large amounts of carbon dioxide are emitted into the environment, which contributes to poor air quality and global warming. As a result, many are interested in using alternative energy sources which are less expensive and more environmentally friendly. One type of alternative energy source that is becoming increasingly popular is solar power. Solar power is a renewable power source that produces power at a fuel cost of zero and can be used in a variety of settings, including but not limited to residential, municipal and commercial property settings.

A problem with solar power, however, is that there is a significant upfront cost associated with obtaining the equipment and components necessary to utilize a solar power system. Thus, although many individuals are interested in utilizing solar power, the upfront expense of switching from the electric power grid to solar power is prohibitively expensive.

What is needed then is a solar powered light that can be integrated with or attached to light fixtures connected to the electric grid.

BRIEF SUMMARY OF THE INVENTION

Certain embodiments of the present invention are directed to a solar powered light for providing an additional or alternative lighting source in a light fixture and provide one or more benefits and advantages not previously offered in the art, including but not limited to a solar powered light that can be added to an existing light fixture. Another advantage of the present invention is that it provides a solar powered lighting option to individuals that do not want to make the initial investment of transferring from the electric grid to solar power. Further, the present invention includes a light fixture having lights powered from multiple power sources.

In one configuration, the present invention comprises a light assembly comprising a globe having a lighting element powered by the electric grid and a solar powered lighting element. A solar panel is coupled to the solar powered lighting element and collects light to generate power for the solar powered lighting element. A rechargeable power source is coupled to the solar panel and the solar powered lighting element for storing the power generated by the solar panel and powering the solar powered lighting element. The present invention can include a sensor for detecting an ambient light level. The solar powered lighting element is then activated when the ambient light level is below a desired ambient light level. The present invention can also include an additional sensor for detecting output levels of the solar powered lighting element. The lighting element powered by the electric grid is then activated when the output level of the solar powered lighting element is below a desired output level and when the ambient light level is below a desired ambient light level.

The present invention also includes a method of retrofitting a light fixture with a solar powered light comprising attaching a solar powered lighting element to a globe of a light fixture, the light fixture having at least one lighting element connected to an electrical grid power source. Light is collected with a solar panel coupled to the solar powered lighting element and power is generated from the collected sun light. The power generated from the sun light is stored with a rechargeable power source. The ambient light level may be sensed by a sensor and the solar powered lighting element may be illuminated with the power from the rechargeable power source when an ambient light level is lower than a pre-determined ambient light level.

BRIEF DESCRIPTION OF THE SEVERAL VIEWS OF THE DRAWING(S)

The foregoing features of this invention, as well as the invention itself, may be more fully understood from the following description of the drawings in which.

DETAILED DESCRIPTION OF THE INVENTION

Figure 1:
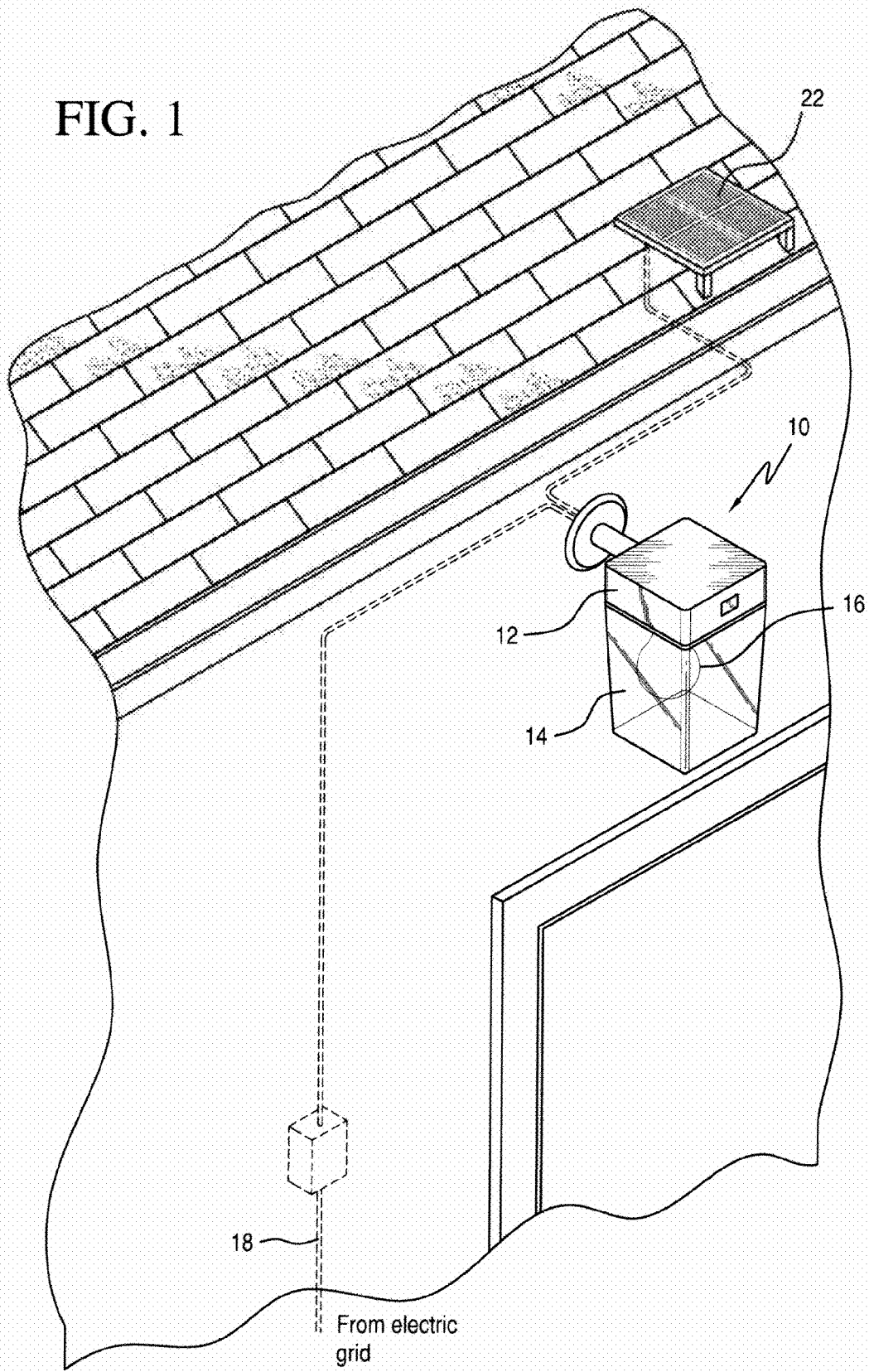
FIG. 1 is a perspective view of a light fixture having an electrical grid powered light and a solar powered light coupled to a solar panel mounted to a separate structure.

At the outset, it should be appreciated that like drawing numbers on different drawing views identify identical structural elements of the invention. While the present invention is described with respect to what is presently considered to be the preferred embodiment, it is understood that the invention is not limited to the disclosed embodiment.

Furthermore, it is understood that the invention is not limited to the particular methodology, materials, and modifications described and as such may vary. It is also understood that the terminology used herein is for the purpose of describing particular elements only, and is not intended to limit the scope of the present invention, which is limited only by the appended claims.

Referring to the Figures, FIGS. 1-5 show a light fixture 10 having a housing 12, a globe 14, and lighting element 16 disposed within the globe 14. The light fixture 10 is connected to an electric grid power source 18. The light fixture 10 further includes a solar powered lighting element 20 disposed within the globe 14 and connected to a solar power source. That is, lighting element 20 is connected to a solar panel 22 and to a rechargeable power source 24 as discussed in further detail below. The solar powered lighting element 20 provides an alternative or additional lighting source to the lighting element 16 in the light fixture 10. A sensor 26 is connected to the solar powered lighting element 20 to detect the ambient light levels and activates the solar powered lighting element 20 when the ambient light levels are below a certain desired level. In one configuration, a second sensor 28 is connected to the lighting element 16 and activates the lighting element 16 when the ambient light level is below the desired level and when the solar powered lighting element 20 is lower than a desired minimum light output level.

The light fixture 10 can be any type of configuration wherein a lighting element 16 is contained within a globe 14. By globe 14, it is meant that the light fixture includes a portion that at least partially covers the lighting element 16 and is coupled to a single electric grid power source. For example, the globe 14 may be any type of shade, jar, can, diffuser, or any other type of glass, plastic, metal light housing that is coupled to a single electric grid power source. In one configuration, the light fixture 10 is an outdoor light for residential, municipal, or commercial purposes. For example, the light fixture may be an outdoor porch light, recreational light, or free standing light. Alternatively, the light fixture 10 can be located within a naturally-lit indoor area. Typically, the electrical grid powered light fixture 10 is connected to the electrical grid by wires to receive power. The electrical grid powered lighting element 16 can be operated by a switch, for example, a wall switch, to turn the lighting element 16 on and off. The lighting element 16 is preferably an incandescent light, fluorescent light, including but not limited to compact fluorescent lights and linear fluorescent lights, high intensity discharge lights, halogen light, or light emitting diode (LED) light. It should be appreciated by those having ordinary skill in the art that the lighting element 16 may include just one light bulb or a plurality of light bulbs.

Figure 2:
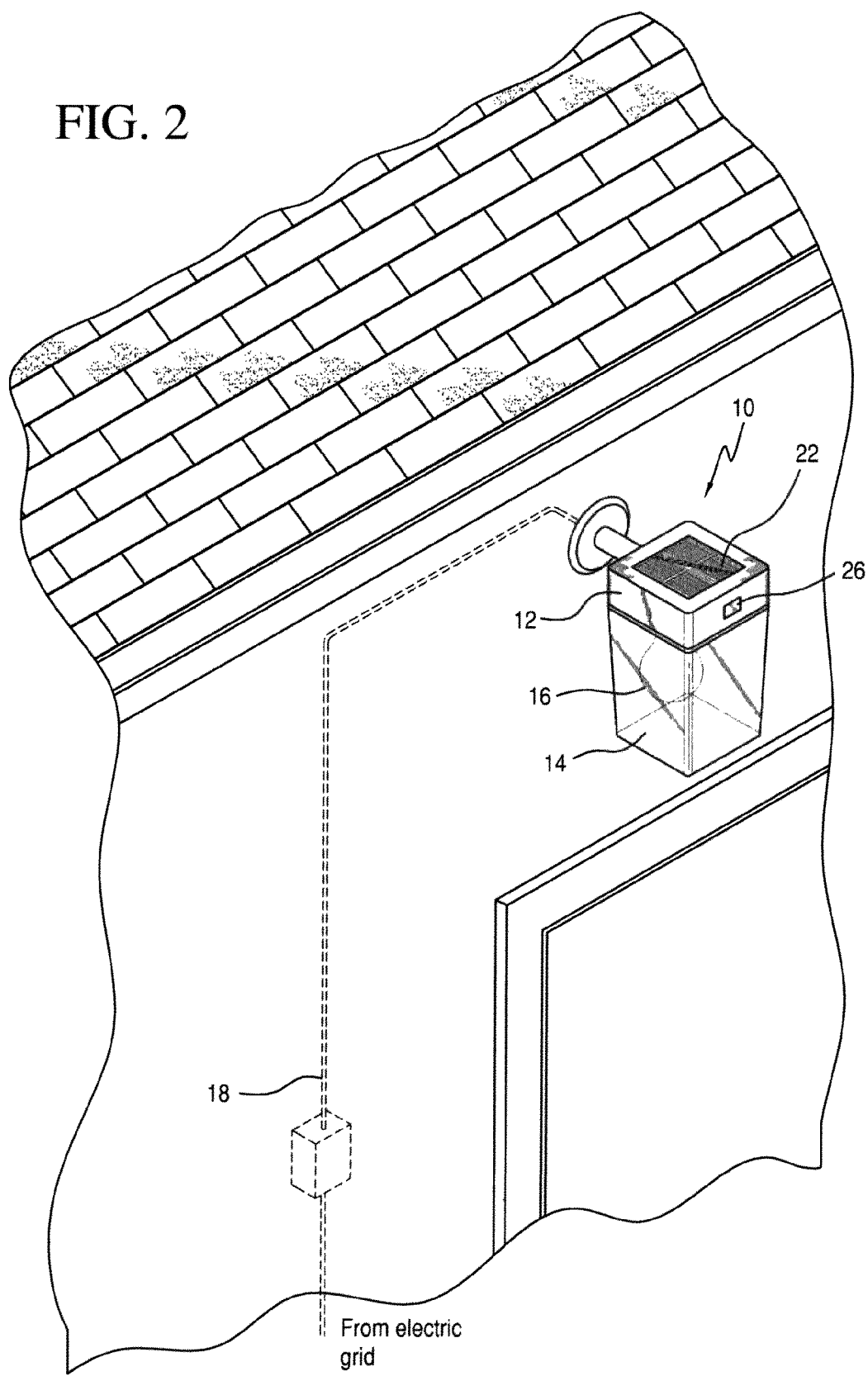
FIG. 2 is a perspective view of the light fixture having an electrical grid powered light and a solar powered light coupled to a solar panel mounted to the light fixture.
Figure 3:
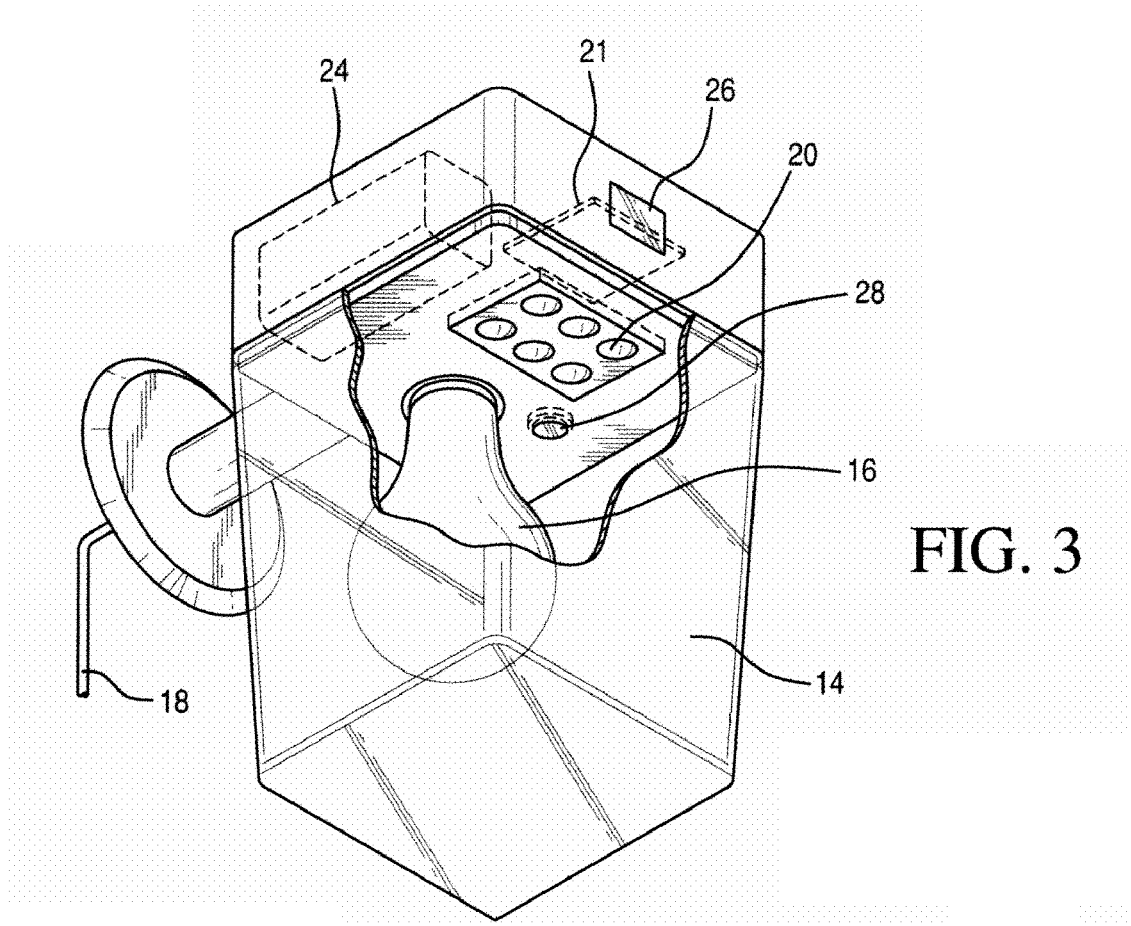
FIG. 3 is a bottom perspective view of the light fixture showing an electrical grid powered light and a solar powered light.
Figure 5:
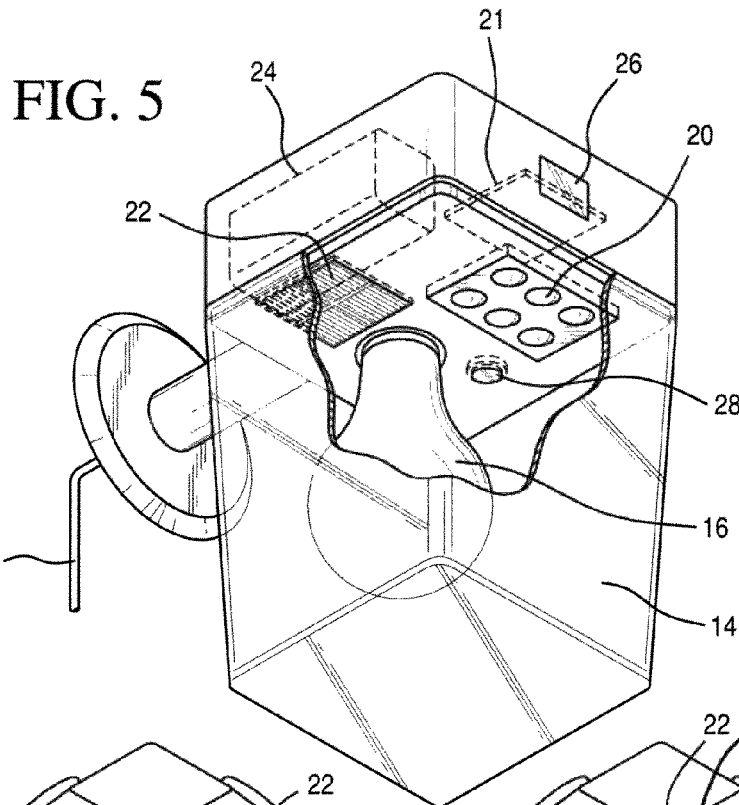
FIG. 5 is a bottom perspective view of the light fixture showing an electrical grid powered light, a solar powered light, and an additional solar panel positioned to collect light from the electrical grid powered light.

As shown in the figures, the lighting element 20 is preferably a solar powered light that is self-powered by the solar panel 22. The solar panel 22 comprises a plurality of electrically connected photovoltaic cells. A plurality of solar panels 22 can also be used. The solar panel 22 can be mounted proximate to the light fixture, for example on the building structure itself, as shown in FIG. 1. In another configuration, as shown in FIG. 2, the solar panel 22 is contained within a housing 12 of the light fixture 10. It should be appreciated by those having ordinary skill in the art that additional solar panels can be used and these modifications are intended to be within the spirit and scope of the invention as claimed. For example, as shown in FIG. 5, an additional solar panel 22 can be mounted within the globe 14 to collect light from the lighting element 16 powered by the electrical grid. Thus, if the lighting element 16 is illuminated by power from the electric grid, solar power can be generated from the lighting element 16.

The rechargeable power source 24 is preferably one or more rechargeable batteries of a conventional design, which are capable of storing power that is generated by the solar panel 22 so that it can be used at a later time to power the lighting element 20. The lighting element 20 is preferably an LED since LED lights are energy efficient and long lasting. However, other types of light elements can be used including, but not limited to, incandescent, halogen, fluorescent and high intensity discharge lights. In an embodiment of the invention, at least one mirror 32 can be operatively positioned within the housing 12 of the light fixture 10 to focus and reflect the light in a preferred direction.

The sensor 26 monitors the ambient light levels. The sensor 26 determines whether the transition from day to night has occurred. When the sensor 26 determines that the light level is lower than a pre-determined light level, for example, dusk, the sensor 26 will switch on the solar powered lighting element 20. When the sensor 26 determines that the ambient light level is greater or equal to the pre-determined light level, the sensor will switch off the solar powered lighting element.

The sensor 28 simultaneously monitors the light output level of the lighting element 20. The sensor 28 determines whether the light output level of the lighting element 20 is lower than a minimum light output level. If the light output level of the lighting element 20 is lower than the minimum light output level, then the sensor will switch on the lighting element 16. However, the lighting element 20 will only be switched on if the sensor 26 has determined that the ambient light level is lower than a pre-determined light level.

It should be appreciated by those having ordinary skill in the art that additional components may be used to increase the light output level of the lighting element 20 as the ambient light level decreases and this modification is intended to be within the scope of the invention as claimed. Further timers or manual switches may also be used to switch on and off the lighting elements 16, 20.

Figure 4:
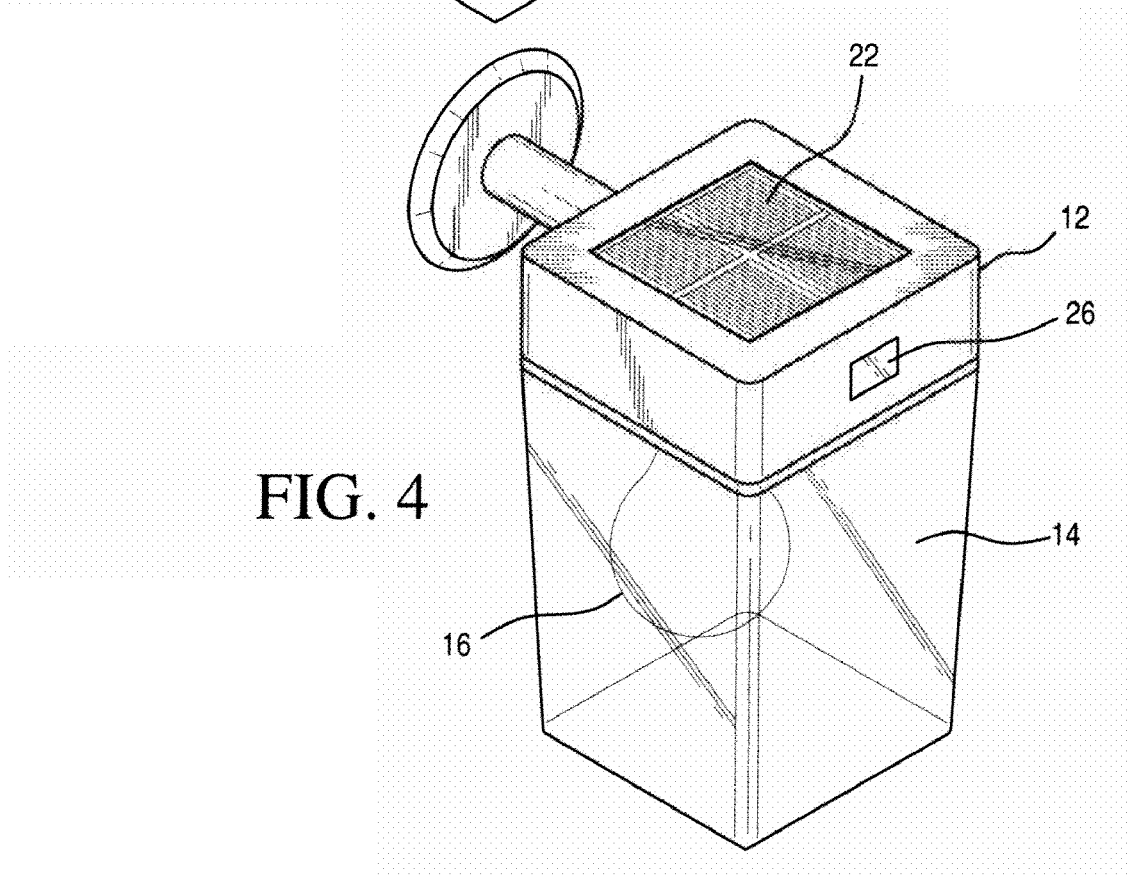
FIG. 4 is a top perspective view of the light fixture which is capable of being mounted to an electrical grid power source.

The configuration in FIG. 4 shows that the light fixture 10 can be attached to a pre-existing electrical grid power source for a light fixture to provide a retro-fit light fixture. The light element 20 in this configuration is integral to the light fixture 10.

Figure 6:
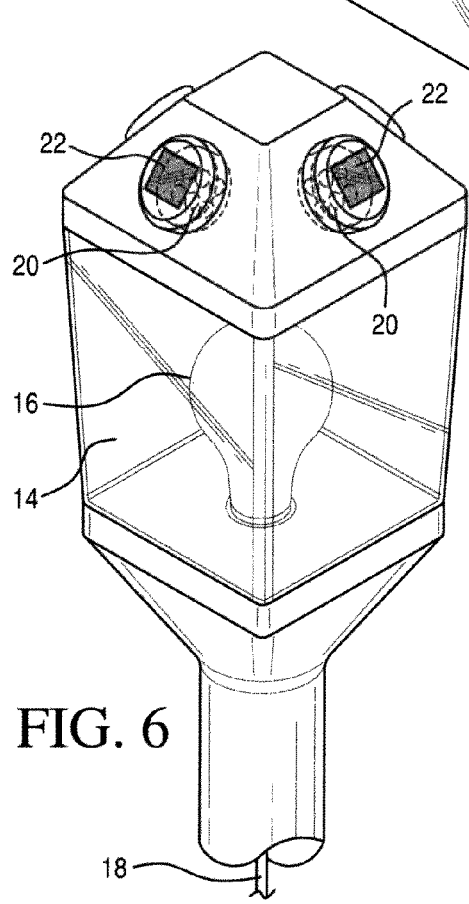
FIG. 6 is perspective view of a free standing light fixture showing an electrical grid powered light and a solar powered light.
Figure 7:
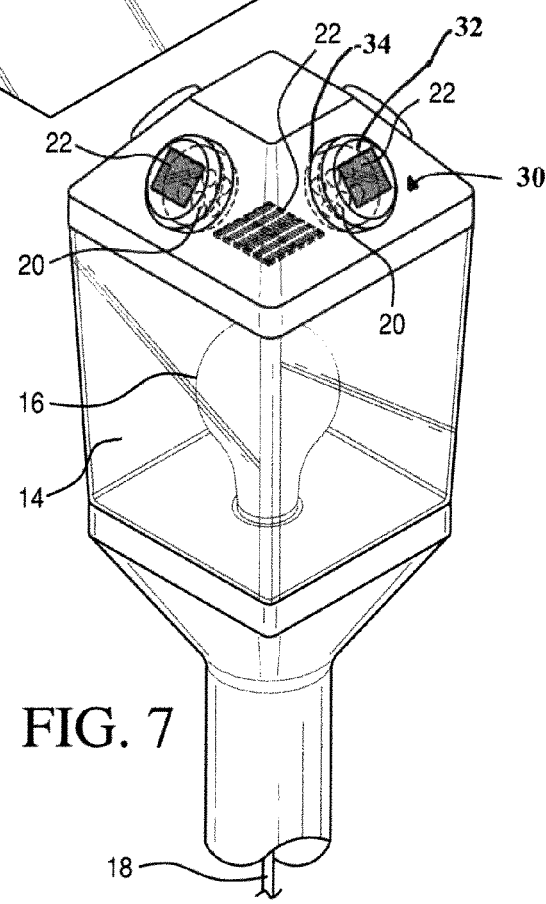
FIG. 7 is a perspective view of a free standing light showing an electrical grid powered light, a solar powered light and an additional solar panel positioned to collect light from the electrical grid powered light.

As shown in FIGS. 6 and 7, a pre-existing light fixture 10 can be retro-fit with a solar powered lighting element 20 contained within a housing 30, wherein the solar panel 22 is disposed on a top portion 32 of the housing 30 and the lighting element 20 is coupled to the bottom portion 34 of the housing 30. The lighting element 20, therefore, is positioned within the globe 14. To attach the housing 30 to the pre-existing light fixture 10, a hole can be drilled through the housing 12 of the light fixture 10 and the top portion 32 of the housing 30 is disposed on top of the housing 12 of the light fixture 10 and over hole. In a configuration of the invention, one pre-existing light fixture 10 can include multiple housings 30 having the lighting element 20 and solar panel 22. It should be appreciated by those having ordinary skill that the housing 30 can further include certain other components for powering the lighting element 20 disclosed herein, including but not limited to a rechargeable battery 24, sensors 26, 28 and controller 21. As shown in FIG. 7, at least one additional solar panel 22 can be installed within the globe 14 to collect power from the lighting element 16 when illuminated. Further, it should be appreciated that the housing 12 of the original light fixture 10 can be removed and replaced with a retro-fitted housing 12 having the solar panel(s) 22, lighting element 20, battery 24, sensors 26, 28 and controller 21 integrated therein.

Figure 8:
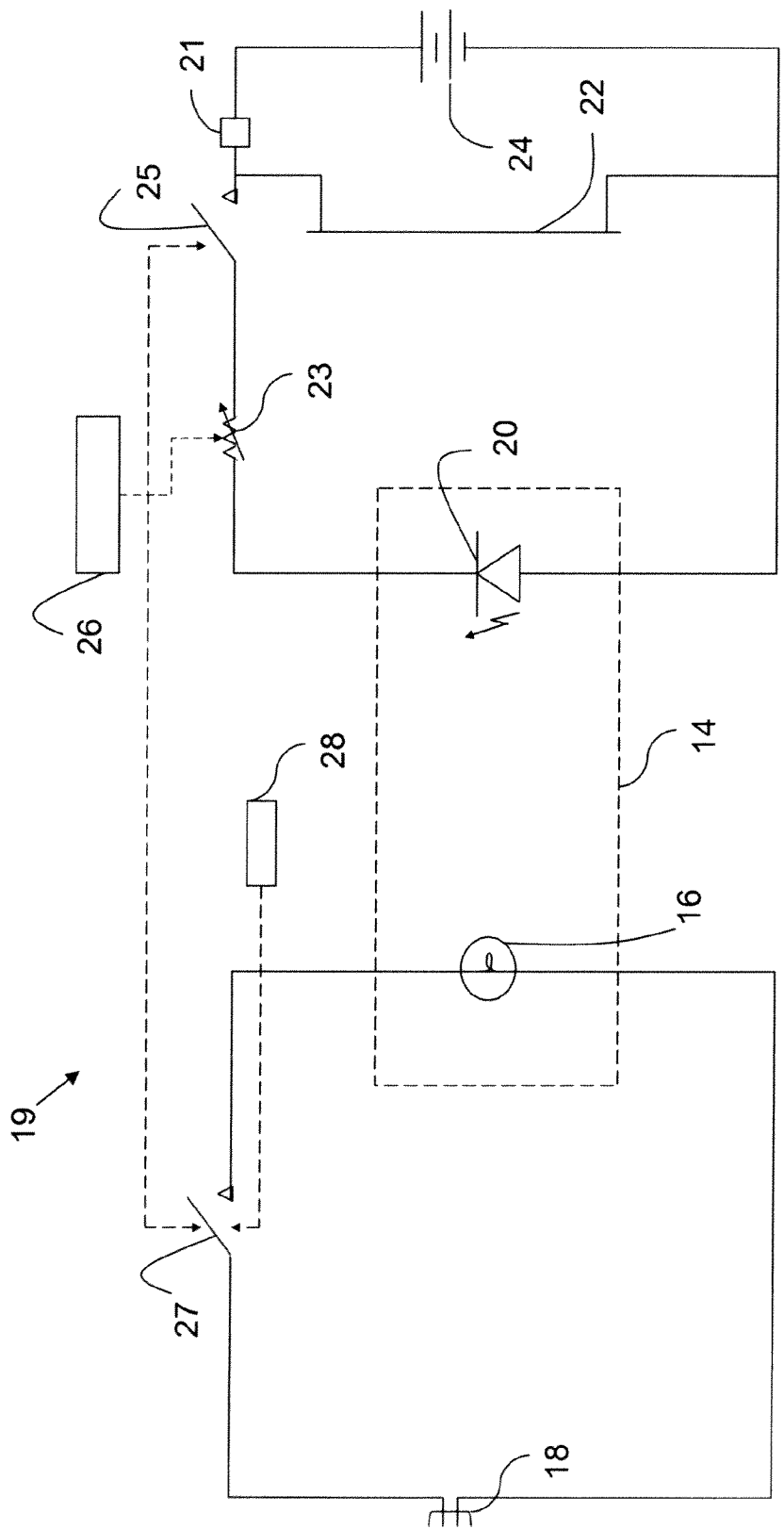
FIG. 8 is a schematic diagram of an exemplary control circuit for controlling the operation of the various components of an exemplary embodiment of the invention.

FIG. 8 is a schematic diagram of an exemplary control circuit 19 for controlling the operation of the various components of an exemplary embodiment of the invention. The control circuit 19 shown in FIG. 8 controls the operation of various components as will be described in more detail below.

While control circuit 19 contemplates a standard 120 volt AC electric grid power source 18, it should be appreciated by those having ordinary skill in the art that other arrangements that function in substantially the same way may also be employed using either higher or lower voltages, AC or DC, logic levels or the like, as long as the function or functions provided by the circuit of FIG. 8 are carried out.

As shown in FIG. 8, the lighting element 16 is connected to the electrical grid power source 18 while the lighting element 20 is connected to the battery 24 which is rechargeable by the solar panel 22. The lighting elements 16 and 20 are both contained within the globe 14.

The ambient light sensor 26 detects ambient light levels and controls switches 25 and 27. When the sensor 26 is in an ambient light level that is below a pre-determined ambient light level, the switch 25 is switched to the on position and power flows from the rechargeable battery 24 to illuminate the lighting element 20. Pre-determined ambient light levels may be, for example, when the sensor 26 is in darkness or at dusk light levels. Sensor 28 detects the output level of the lighting element 20 powered by solar panel 22 and also controls switches 25 and 27. If the battery 24 does not have enough power stored to power lighting element 20 to illuminate the lighting element 20 to a minimum output level, and if the ambient light sensor 26 determines that the ambient light level is below a pre-determined ambient light level, then switch 27 is switched to the on position and power flows from the electric grid 18 to illuminate the lighting element 16. Typically, the switch 25 is then switched to the off position. Once the ambient light sensor 26 is no longer below the pre-determined ambient light level, switch 25 and/or switch 27 are switched to the off position. In one configuration, the battery 24 can be at least partially recharged when the solar panel 22 collects light from the lighting element 16. A charge controller 21 is preferably wired between the solar panel(s) 22 and the battery 24 to monitor and control the current from the solar panel(s) 22 and to shut the power off when the battery 24 is fully charged to prevent over-charging and damage to the battery 24. In one configuration, a resistor 23 limits the amount of current directed to the lighting element 20 and controls the brightness of the lighting element 20. The amount of light produced by the lighting element 20 can be increased or decreased by increasing or decreasing the amount of current used to power the lighting element 20. An additional solar panel may be added such that one solar panel collects light from the sun light and another solar panel collects light from the lighting element 16 when lighting element 16 is illuminated.

Figure 9:
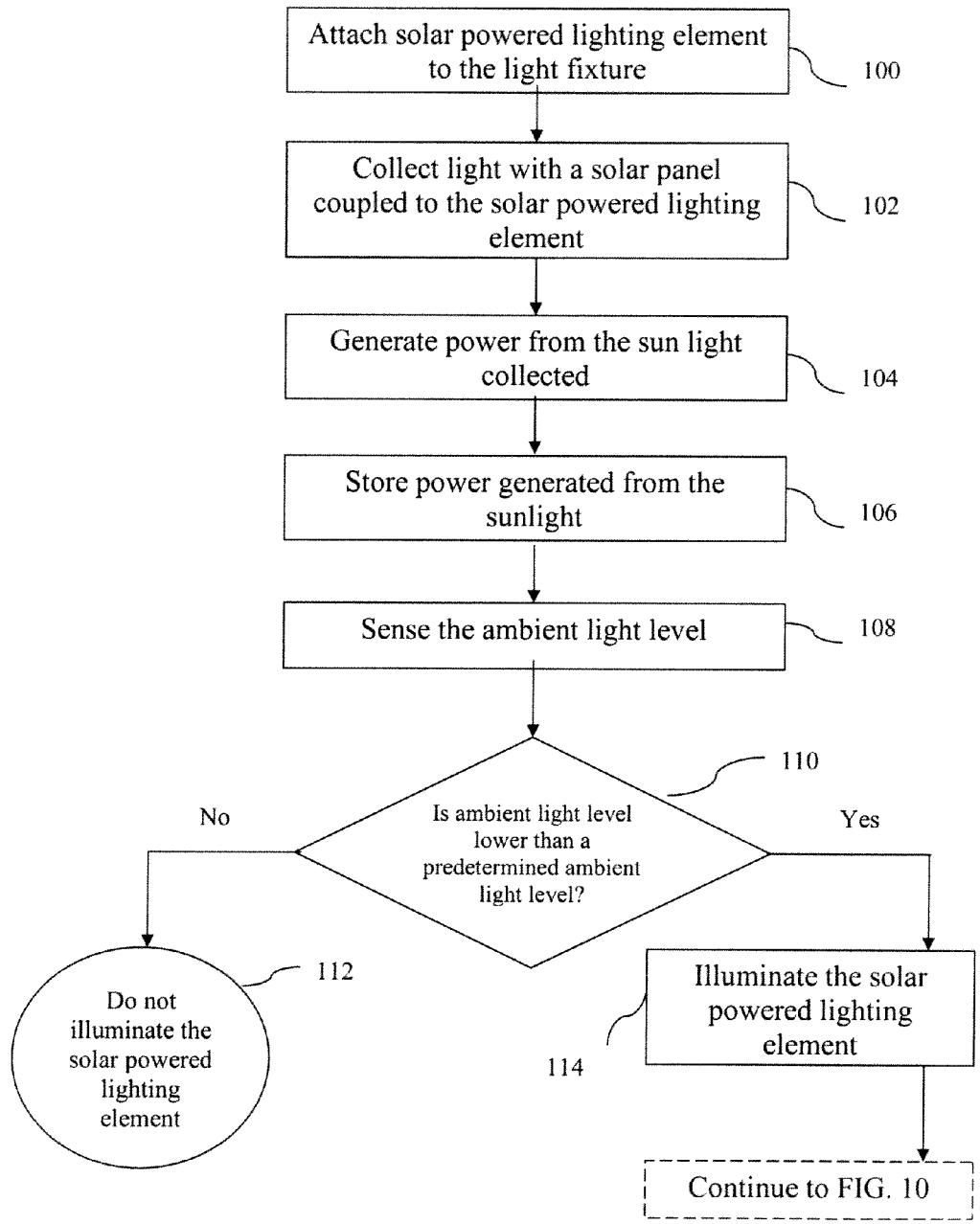
FIG. 9 is a flow diagram depicting an embodiment of a method of retrofitting a light fixture with a solar powered light.
Figure 10:
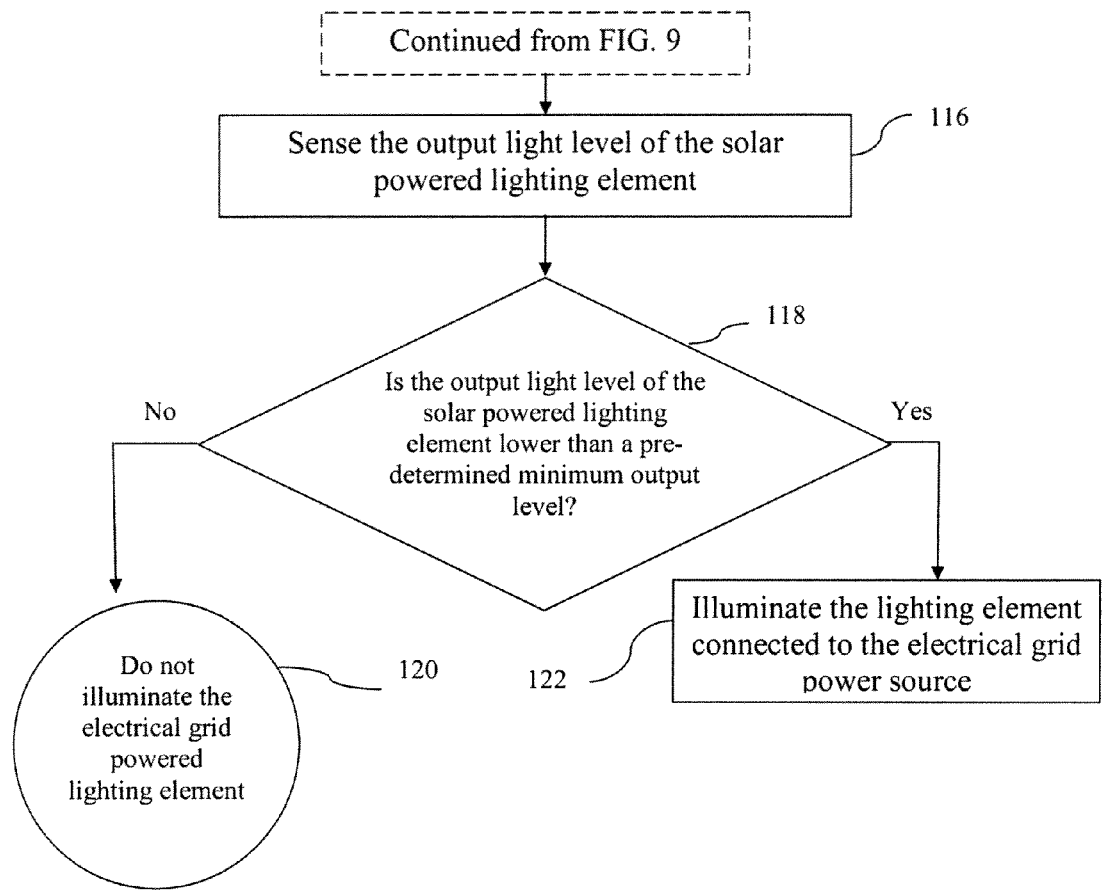
FIG. 10 is a continuation of the flow diagram of FIG. 9 depicting an embodiment of a method of retrofitting a light fixture with a solar powered light.

Referring to FIGS. 9 and 10, an embodiment of a method of retrofitting a light fixture with a solar powered light is depicted. Generally, according to step 100, the solar powered lighting element 20 is attached to the light fixture 10 that has at least one lighting element 16, which lighting element 16 is connected to the electrical grid power source 18. Then, a solar panel 22, which is connected to the lighting element 20 and the rechargeable power source 24 collects light according to step 102. Power is generated from the sun light by the solar panel 22 as set forth in step 104. The rechargeable power source 24 is used to store the power generated by the solar panel 22, as set forth in step 106. According to step 108, the sensor 26 senses the ambient light level and, as set forth in step 110, determines whether the ambient light level is lower than a predetermined ambient light level. If the ambient light level is lower than a pre-determined ambient light level, the solar powered lighting element 20 is illuminated as set forth in step 114. As set forth in step 112, if the ambient light level not lower than a pre-determined ambient light level, the solar powered lighting element 20 then the solar powered lighting element 20 is not illuminated.

According to step 116, an output light level of the solar powered lighting element 20 is also sensed by a sensor 28. As set forth in step 118, the sensor determines whether the output light level of the solar powered lighting element 20 is lower than a predetermined minimum output level. If the output light level of the solar powered lighting element 20 is not lower than a predetermined minimum output level, then the lighting element 16 connected to the electrical grid power is not illuminated as set forth in step 120. If the output light level of the solar powered lighting element 30 is lower than a predetermined minimum output level, and the ambient light level is lower than a pre-determined ambient light level as previously determined in step 110, then the lighting element 16 connected to the electrical power grid 18 is illuminated.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention claimed is:

1. A light assembly comprising:
   a light fixture;
   an electric grid powered lighting element connected to the light fixture;
   a solar powered lighting element connected to the light fixture;
   a solar panel coupled to the solar powered lighting element for collecting solar light and for generating power for the solar powered lighting element;
   photovoltaic cells coupled to the solar powered lighting element for collecting light from the electric grid powered lighting element and for generating power for the solar powered lighting element;
   a rechargeable power source coupled to the solar panel, the photovoltaic cells and the solar powered lighting element for storing the power generated by the solar panel and the photovoltaic cells and powering the solar powered lighting element;
   a first sensor for detecting an ambient light level and activating the solar powered lighting element when the ambient light level is below a desired ambient light level; and
   a second sensor operatively coupled to the electric grid powered lighting element for detecting output levels of the solar powered lighting element and activating the electric grid powered lighting element when the output level of the solar powered lighting element is below a desired output level.

2. A light assembly of claim 1, wherein the first sensor increases the output level of the solar powered lighting element upon a decrease in the ambient light level.

3. The light assembly of claim 1, wherein the solar powered lighting element is a LED light.

4. The light assembly of claim 1, further comprising mirrors operatively positioned within the light fixture.

5. A light assembly comprising:
a light fixture;
a first lighting element connected to the light fixture and coupled to an electric grid power source;
a second lighting element connected to the light fixture;
a solar panel coupled to the second lighting element, the solar panel disposed to collect at least one of solar light and light from the first lighting element and to generate power for the second lighting element;
a rechargeable power source coupled to the solar panel and the second lighting element, the rechargeable power source disposed to store the power generated by the solar panel for the second lighting element;
a first sensor for activating the second lighting element when an ambient light level is lower than a pre-determined ambient light level; and
a second sensor for activating the first lighting element when the ambient light level is lower than the pre-determined ambient light level and a light output level of the second lighting element is lower than a minimum light output level.

6. The light assembly of claim 5, wherein a resistor increases the light output level of the second lighting element as the ambient light level decreases.

7. The light assembly of claim 5, wherein the light fixture further comprises a housing, wherein the second lighting element is located within the housing.

8. The light assembly of claim 7, wherein the solar panel is mounted to the housing having the second lighting element.

9. The light assembly of claim 7, wherein the second lighting element is removeably secured within the housing.

10. The light assembly of claim 5, wherein the solar panel is positioned to collect light from the first lighting element for generating power for the second lighting element.

11. The light assembly of claim 5, wherein the second lighting element is permanently affixed to the light fixture.

12. The light assembly of claim 5, wherein the solar panel collects light from the sun.

13. The light assembly of claim 5, wherein the first lighting element is selected from a group consisting of an incandescent light, a fluorescent light, a halogen light, and an LED light.

14. The light assembly of claim 5, wherein the second lighting element is a LED light.

15. A method of retrofitting a light fixture with a solar powered light comprising:
attaching a solar powered lighting element to a light fixture, the light fixture having at least one lighting element connected to an electrical grid power source;
collecting light from the at least one lighting element connected to the electrical grid power source with a solar panel coupled to the solar powered lighting element;
generating power from the collected light;
storing the power generated from the collected light with a rechargeable power source;
sensing the ambient light level;
illuminating the solar powered lighting element with the power from the rechargeable power source when an ambient light level is lower than a pre-determined ambient light level;
sensing an output light level of the solar powered lighting element; and
illuminating the at least one lighting element connected to the electrical grid power source when the ambient light level is lower than the pre-determined ambient light level and when the solar powered lighting element output light level is lower than a pre-determined minimum output level.

16. The method of claim 15 further comprising switching off the solar powered lighting element when the ambient light is equal to or greater than the pre-determined ambient light level.

17. The method of claim 15 further comprising switching off the illuminated at least one lighting element connected to an electrical grid power source when the ambient light level is equal to or greater than the pre-determined ambient light level.

18. A light assembly comprising:
a light fixture;
an electric grid powered lighting element connected to the light fixture;
a solar powered lighting element connected to the light fixture;
a solar panel coupled to the solar powered lighting element for collecting at least one of solar light and light from the electric grid powered lighting element and generating power for the solar powered lighting element;
a rechargeable power source coupled to the solar panel and the solar powered lighting element for storing the power generated by the solar panel and powering the solar powered lighting element;
a first sensor for detecting an ambient light level and activating the solar powered lighting element when the ambient light level is below a desired ambient light level; and
a second sensor operatively coupled to the electric grid powered lighting element for detecting output levels of the solar powered lighting element and for activating the electric grid powered lighting element when the output level of the solar powered lighting element is below a desired output level.

* * * * *